Sept. 3, 1968        C. W. VOGT        3,399,931
FEED MECHANISM
Filed July 8, 1966        2 Sheets-Sheet 1
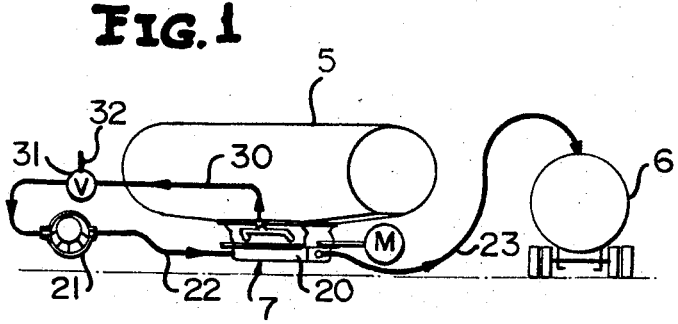
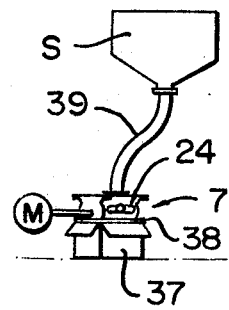
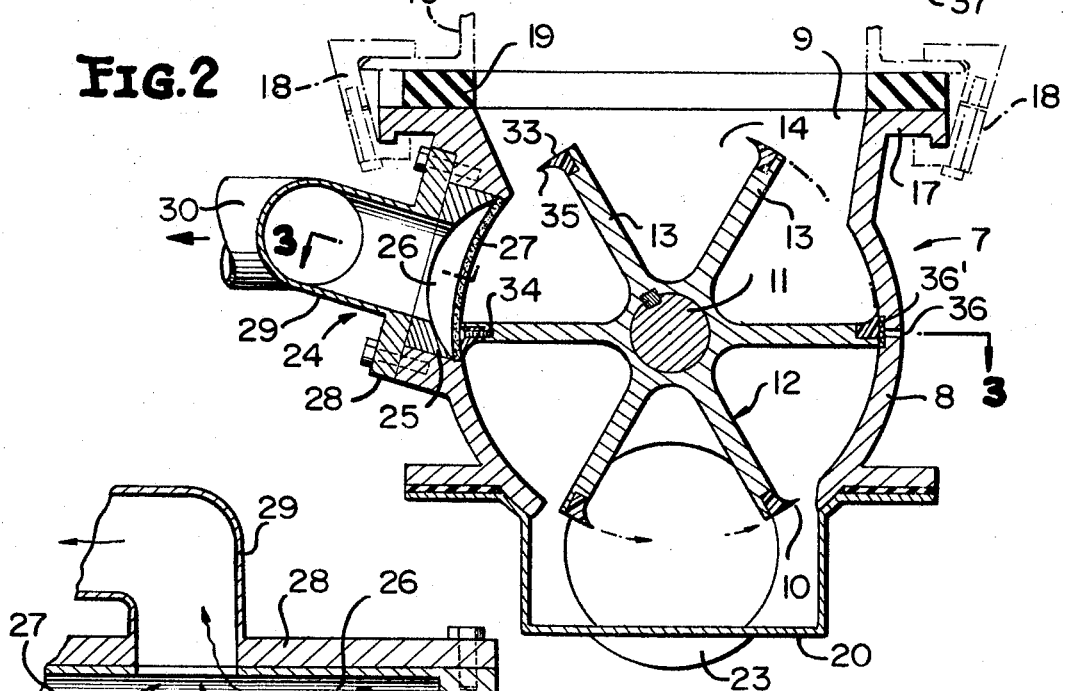
INVENTOR
CLARENCE W. VOGT
BY Mason, Porter, Diller & Brown
ATTORNEYS

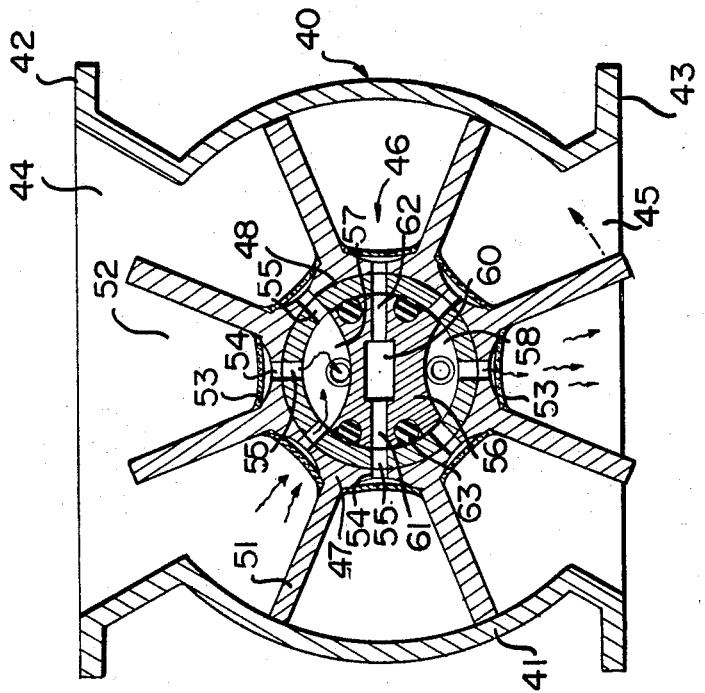
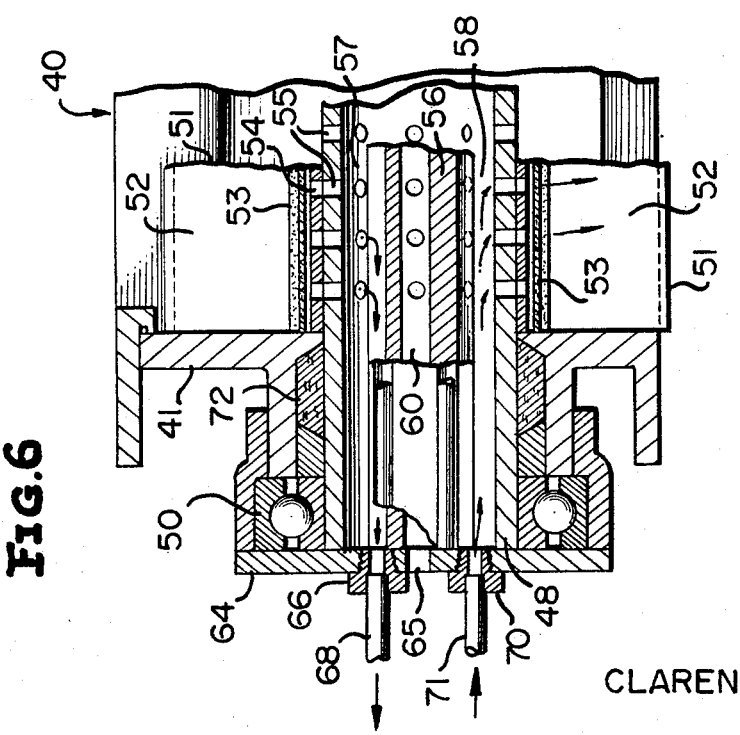

United States Patent Office 3,399,931
Patented Sept. 3, 1968

3,399,931
FEED MECHANISM
Clarence W. Vogt, Box 232,
Westport, Conn. 06880
Filed July 8, 1966, Ser. No. 563,835
12 Claims. (Cl. 302—49)

This invention relates in general to new and useful improvements in feed mechanisms, and more particularly to a novel feed mechanism particularly adapted for the feeding of pulverulent materials.

It is well known that pulverulent materials will not freely flow when compacted. As a result, when pulverulent materials are being fed it is necessary that it be relatively loose. Under these conditions, a large quantity of air or other gases is entrapped therein. While this entrapped air is beneficial in facilitating the initial feeding of the pulverulent material, it is disadvantageous from an efficiency standpoint. For example, when a container is being filled with relatively loose pulverulent material, the weight of such material which can be placed in a given container does not favorably compare with the weight of the material when compacted in a like container. There is also the dust problem involved. Furthermore, when it is desired to further convey the pulverulent material, the efficiency of the conveying apparatus is greatly reduced, particularly when the pulverulent material is air entrained.

In accordance with this invention, it is proposed to increase the efficiency of a feed mechanism which is particularly designed to handle relatively loose pulverulent material by applying a vacuum or suction to the feed mechanism so as to both facilitate the drawing of the loose pulverulent material down into the feed mechanism and removing large quantities of the entrapped air or other gases therefrom whereby the pulverulent material delivered by the feed mechanism is substantially compacted and relatively air or gas free as compared to the relatively loose pulverulent material.

Another object of this invention is to provide a novel feed mechanism of the type including a housing in which there is mounted for rotation a pocketed impellor for delivering the pulverulent material from the inlet of the housing to the outlet thereof, and a wall of the housing along which the impellor pockets pass in the movement thereof between the inlet and the outlet with suction means which apply suction to the pockets and remove substantial quantities of entrapped air and gases from the pulverulent material being conveyed in the pockets.

Another object of this invention is to provide in a feed mechanism of the pocketed impellor type, a vacuum unit which will remove large quantities of entrapped air and other gases from pulverulent material carried by the pockets of the impellor, the vacuum unit including a filter through which air and other gases may freely pass, but which prevents the movement of the pulverulent material therethrough, the filter being positioned at the bottom of each pocket of the impellor and there being provided suitable valve means within the impellor for first drawing a vacuum through the filter and then applying pressure back through the filter, as well as means for venting the pocket through the filter.

A further object of this invention is to provide a novel feed mechanism having associated therewith a vacuum unit for drawing off air and other gases entrapped within pulverulent material held thereby, the feed mechanism being of a construction whereby it is readily adaptable for use both in a filling operation and in the further conveying of the pulverulent material by the air entrainment thereof.

With the above and other objects in view that will hereinafter appear, the nature of the invention will be more clearly understood by reference to the following detailed description, the appended claims and the several views illustrated in the accompanying drawings:

In the drawings:

FIGURE 1 is a schematic view showing the feed mechanism which is the subject of this invention being utilized in the transfer of pulverulent material from one large container to another with there being movement of the pulverulent material through air entrainment thereof.

FIGURE 2 is an enlarged transverse sectional view taken across the feed mechanism of FIGURE 1 and shows the specific details of the construction thereof.

FIGURE 3 is an enlarged fragmentary generally horizontal sectional view taken along the line 3—3 of FIGURE 2 and shows further the details of the feed mechanism.

FIGURE 4 is a schematic view showing the feed mechanism being used as a filler.

FIGURE 5 is a transverse sectional view similar to FIGURE 2 and taken through a modified form of feed mechanism.

FIGURE 6 is a fragmentary longitudinal sectional view through the feed mechanism of FIGURE 5 along the vertical center thereof.

Referring now to the drawings in detail, it will be seen that there is illustrated in FIGURE 1 two large containers 5 and 6. Under normal conditions, the container 5 will be a freight car and the container 6 will be a truck. However, as far as this invention is concerned, the type of containers is immaterial.

In order to transfer pulverulent material from the container 5 to the container 6, there is attached to the underside of the container 5 a feed mechanism 7 which is formed in accordance with this invention.

Referring now to FIGURE 2 in particular, it will be seen that the feed mechanism 7 is of the pocketed impellor type and includes a housing 8 having an inlet 9 and and outlet 10. Extending axially through the housing 8 is a shaft 11 on which there is keyed a pocketed impellor 12. The impellor 12 is formed of a plurality of radiating vanes 13 with each two adjacent vanes 13 defining therebetween a pocket 14 which opens radially outwardly from the center of the impellor 12. As is best shown in FIGURE 3, the shaft 11 is rotatably journalled in the housing 8 by means of suitable bearings 15 in a conventional manner. The shaft 11 is driven by means of a suitable motor unit which is identified in FIGURE 1 as motor M.

It is to be understood that the underside of the container 5 will be provided with a suitable holder structure which is schematically shown in FIGURE 2 and generally identified by the numeral 16. The upper surface of the housing 8 is in the form of a flange 17 which corresponds generally to the outline of the hopper 16 and underlies a similar flange. Suitable adjustable fasteners 18 serve to clamp the housing 8 to the underside of the hopper 16 with a seal being formed between the housing 8 and the hopper 16 by means of a gasket 19.

The feed mechanism 7 has associated therewith a duct 20 wherein pulverulent material delivered by the impellor 12 to the exit 10 of the housing 8 is air entrained. The duct 20 is coupled to a suitable air compressor or blower 21 by means of an air line 22. The air line 22 is coupled to one end of the duct 20. A discharge line 23 is connected to the opposite end of the duct 20 and is suitably connected to the container 6.

Referring once again to FIGURE 2 in particular, it will be seen that there is carried by the housing 8 of the feed mechanism 7 a manifold assembly which is identified by the numeral 24. The manifold assembly 24 includes an elongated manifold member 25 which extends substantially the full length of the housing 8 and is seated within a suitable recess therein. The manifold member 25 defines an elongated suction or vacuum passage 26 which extends axially of the housing 8. The inner end of the passage 26 is closed by a filter which is preferably formed of sintered metal or plastic. The filter 27 is porous as opposed to being apertured and while it will freely pass air and other gases, it excludes the passage of fine solid particles.

The manifold member 25 is secured in place by means of a plate 28 which is part of the manifold assembly and has exhaust manifold piping 29 extending therefrom. A suction or vacuum line 30 extends from the manifold piping 29. In accordance with this invention, and as is best shown in FIGURE 1, the suction line 30 extends from the feed mechanism 7 to the inlet of the compressor 21. In order that the suction in the manifold assembly 24 may be maintained at a predetermined maximum, there is positioned in the suction line 30 a valve 31 having a secondary inlet 32 which is automatically opened when the suction is above the predetermined maximum.

Referring once again to FIGURE 2 in particular, it will be seen that the outer ends of each of the vanes 13 is provided with a combined scraper and shoe unit 33. Each combined scraper and shoe unit 33 is secured to its respective vane 13 by means of suitable fasteners 34. It is to be noted that each unit 33 has a relatively sharp leading edge 35 which facilitates the scraping of the pulverulent material which may adhere to the face of the filter 27. Because the unit 33 is preferably formed of a relatively soft material such as plastic, the filter 27 will not be damaged.

It is to be noted that when the feed mechanism 7 functions, as one of the pockets 14 approaches the filter 27, the suction drawn through the filter 27 will begin to take effect and start drawing air from the pulverulent material disposed in the particular pocket 14. Since the air is being drawn from the pulverulent material before the effected pocket is closed relative to the inlet 9, it will be seen that a larger amount of pulverulent material will be drawn into the pocket 14. Then, as the pocket turns in a counterclockwise direction, as shown in FIGURE 2, the pocket will be completely sealed momentarily in alignment with the filter 27 and substantially all air and gases will be drawn from within the pulverulent material. At the same time, the pulverulent material will become substantially compacted in the radial outer part of the pocket. As the impellor 12 rotates, the compacted material will come into alignment with the duct 20 and the compacted material will drop into the duct 20 to be fluidized by the air passing longitudinally therethrough. However, since the pulverulent material dropped into the duct 20 is relatively compacted, it will be seen that a relatively heavy charge of the compacted material will be delivered to the duct 20 and therefore, a large volume of the pulverulent material may be transported by the air flowing through the duct 20.

At this time it is pointed out that the filter 27 has one edge thereof disposed closely adjacent the inlet 9. As is pointed out above, the suction drawn through the filter 27 aids in the filling of each pocket 14 so that a larger than normal quantity of pulverulent material will be disposed within the pocket. It is also to be noted that the lower edge of the filter 27 is spaced sufficiently from the outlet 10 so as to permit the filter 27 to remain sealed relative to the outlet 10 at all times.

When the feed mechanism 7 is associated with the duct 20, the pulverulent material disposed in the radially outward part of each pocket 14 is scavenged by the flowing air so that each pocket is quickly amputated into the duct 20. It is to be noted that the impellor 12 projects down into the duct 20 so as to facilitate this scavenging effect of the air rushing through the duct 20.

It is also to be noted that inasmuch as the duct 20 is under pressure, the pockets 14, after they have discharged the pulverulent material therefrom, contain air and other gases under pressure. It is undesirable that this air be admitted up into the housing 8 in the inlet area. Accordingly, the housing 8 is provided with suitable vent passages 36 through which air under pressure within the pockets 14 can escape as the pockets pass from the outlet 10 towards the inlet 9. These vent passages may be provided with filters 36' to prevent the loss of pulverulent material.

It will be readily apparent that the feed mechanism 7, when equipped with the suction manifold assembly 24, will deliver a large concentration of substantially air and gas free pulverulent material to the duct 20 for fluidization by the air flowing therethrough. Because of the removal of the gases from the pulverulent material both as the pulverulent material passes into the pockets 14 and while within the pockets 14 of the impellor 12, it will be seen that a large quantity of pulverulent material may be supplied by the impeller to the duct 20 for mixing with the air moving therethrough under pressure. By this construction, it is possible to move pulverulent materials of extremely low specific gravity which normally appear as smoke when mixed with air or other gases. Typical products which are extremely difficult to handle when fluidized are carbon black and activated charcoal. Tests have been run on the feed mechanism of the invention and have proved successful with not only these products, but more easily handled products, such as flour.

It is also to be noted that the feed mechanism 7 may be utilized as a filler. When the feed mechanism 7 is utilized as a filler, the duct 20 will be eliminated and the mounting flange of the housing 8 to which the duct 20 is attached will be constructed to provide a seal between the housing 8 and a container, such as the container 37, being filled. Such a base on the housing 8 would be identified by the numeral 38, as is shown in FIGURE 4.

The inlet end of the housing 8 would be constructed for coupling to a gravity tight conduit 39 which, in turn, may be connected to any type of pulverulent material supply source S.

When the feed mechanism 7 is of a construction to be utilized as a filler, it will be readily apparent that the material passing therethrough will have a substantial amount of the entrapped gases removed therefrom. Thus, the pulverulent material, although it normally has a relatively low specific gravity, will be readily compacted and will be delivered in that state into the interior of the container 37. Inasmuch as the pulverulent material delivered by the feed mechanism 7 is relatively gas free, the feed mechanism when utilized as a filler, will enable the placing of a much greater quantity of the same pulverulent material in a carton of a given volume than heretofore has been possible utilizing conventional gravity filling mechanisms. Furthermore, because the excess gases have been removed from the pulverulent material and the filler is sealed relative to the container, it will be seen that the filling operation will be substantially dust free and the normal dust problem will be eliminated.

It is to be understood that the container 37 may be overfilled and the pulverulent material further compacted therein. On the other hand, it is to be understood that it is possible to not fully fill the container 37 and to top off the container by a vacuum pressure differential filling process so as to place still a greater amount of pulverulent material within the container.

Reference is now made to FIGURES 5 and 6 of the drawings wherein there are illustrated the details of a modified form of feed mechanism, which feed mechanism is generally referred to by the numeral 40. The feed mechanism 40 includes an elongated housing 41 which is provided with suitable mounting flanges 42 and 43 at the upper and lower ends, respectively thereof. The upper portion of the housing 41 is in the form of an inlet 44 and the lower portion is in the form of an outlet 45. The housing is elongated as compared to the circular cross section thereof and has rotatably journalled therein an impellor which is generally referred to by the numeral 46. The impellor 46 includes a hub 47 which is mounted on a tubular shaft 48. The tubular shaft 48 is rotatably journalled within the housing 40 by means of suitable bearings, such as the bearings 50 shown in FIG-URE 6. It is to be understood that bearings will be provided at both ends of the tubular shaft 48 and suitable means will be provided at the end which is not illustrated for the purpose of driving the tubular shaft 48.

The impellor 46 also includes vanes 51 which radiate from the hub 47 and wherein each two adjacent vanes 51 defines a pocket 52. The vanes 51 are of a length to close past the adjacent wall of the housing 41 and form a seal therewith.

That portion of each pocket 52 disposed adjacent the hub 47 is provided with a filter 53. The filter 53 is formed of any suitable filter material although sintered materials, such as metals and plastics are preferred. At this time it is pointed out that although the filter 53 is illustrated as being a relatively narrow filter and disposed at the base portion only of the respective pocket 52, it is to be understood that the filter 53 may have portions extending coextensive with the vanes 51 so as to provide greater filter areas. In such event, it would be necessary to provide suitable grooves in the faces of the vanes 51.

In order to provide for fluid flow through each filter 53, at the bottom of each of the pockets 52, the hub 47 is provided with a series of longitudinally spaced apertures 54. Similar apertures 55 are formed in the tubular shaft 48 in alignment with the apertures 54. In order to control the flow of fluid through the filters 53, there is positioned within the tubular shaft 48 a valve member 56 which is dumbbell shape in cross section. The valve member 56 is not symmetrical, but is of a configuration to provide a large upper port 57 and a smaller cross sectional lower port 58.

In addition to the ports 57 and 58, which are defined by the valve member 56 in combination with the tubular shaft 48 and which extend longitudinally of the valve member 56, the valve member 56 is provided with a central vent port 60. The valve member 56 has extending radially therefrom a first set of passages 61 which are spaced axially of the valve member 56 in accordance with the spacing of the passages 54 and 55. A second set of passages 62 extends radially from the vent port 60 in axially spaced relation as determined by the spacing of the passages 54 and 55.

It is to be noted that the valve member 56 is provided with a plurality of seals 63. The seals 63 serve to seal the ports 57 and 58 from one another and from the passages 61 and 62.

Referring now to FIGURE 6 in particular, it will be seen that at one end of the housing 41 there is fixedly mounted a plate 64 which is secured to the housing 41 in any desired manner. The plate 64 has a central opening therethrough which is aligned with the vent port 60. It is also provided with a fitting 66 which connects a vacuum line 68 to the port 57. A further fitting 70 serves to connect a fluid pressure line 71 to the port 58.

At this time it is pointed out also that there are provided suitable seals between the end portions of the tubular shaft 48 and the housing 41. The seals are generally identified by the numeral 72 and may be of any conventional type.

Referring once again to FIGURE 5, it will be seen that as the pockets 52 come into communication with the inlet 44 of the housing 41, the port 57 is uncovered by the passages 55 disposed in communication with the particular pocket 52. As a result, a vacuum is drawn within the pocket 52 and through the filter 53. The drawing of a vacuum at the base of each pocket 52 as it passes in alignment with the inlet 44 greatly facilitates the flow of a pulverulent material into the pockets 52. Furthermore, since entrapped air and other gases are being removed from the pulverulent material as it flows into the pockets 52, it will be readily apparent that the material received within the pockets 52 is in a relatively compacted state. This provides for a three-fold, highly beneficial result. In the first place, that fluid required to facilitate the flow of the pulverulent material into the housing 41 is removed. Secondly, the efficiency of the feed mechanism 40 is increased in that each pocket 52 carries a greater weight of the pulverulent material. Thirdly, because the entrapped gases are substantially entirely removed from the pulverulent material in the pockets 52, the pulverulent materal is relatively uniform and each pocket 52 contains substantially the same amount of the pulverulent material by weight.

In the illustrated form of the invention, the impellor 46 rotates in a counterclockwise direction, as viewed in FIGURE 5. After the vanes 51 defining a pocket 52 have become aligned with the wall of the housing 41, and the pocket 52 is effectively sealed, the passages 54 and 55 of the particular port come into alignment with the passages 61 with the result that the pocket becomes vented to the atmosphere through the vent port 60. This relieves the vacuum within the particular pocket 52.

When the pocket 52 becomes aligned with the outlet 45 of the housing 41, the passages 54 and 55 of the impeller 46 become communicated with the pressure port 58 with the result that fluid under pressure is directed into the pocket 52 through the filter 53 thereof. This aids in the rapid and complete discharge of the pulverulent material from the particular pocket 52.

It is to be understood that depending upon the specific uses of the feed mechanism 40, the air contained within the pockets 52 as they move from the outlet 45, may be slightly pressurized. In order to relieve the pockets 52 of the air under pressure prior to the opening of the pockets at the inlet 44, as the pockets 52 move between the outlet and the inlet, the passages 54 and 55 thereof come into alignment with the passages 62 and the pockets are vented to the atmosphere.

It is to be understood that although the feed mechanism 40 shown in FIGURES 5 and 6 has not been illustrated in conjunction with either transfer mechanism or the filling mechanism as is the case of the feed mechanism 7, it is also to be understood that the housing 41 will so be modified to be utilized in the same environments as those discussed above with respect to the feed mechanism 7.

It is pointed out at this time that although the pockets of the impellor are spaced apart only by the relatively narrow thickness of the vanes, if desired, the vanes could be relatively wide so as to provide a greater spacing between the pockets. This arrangement would be advisable when a pocketed web is being automatically filled by the feed mechanism and would permit the proper alignment of the pockets of the impellor with the pocketed web. In the same manner, it is to be understood that the impellor could be provided with one or more circumferential dividers intermediate the ends thereof so as to divide one of the elongated pockets into two or more shorter pockets. Such an impellor could be utilized in conjunction with a pocketed web having a plurality of transversely aligned pockets.

It is further pointed out that the number of pockets in the impellor is not to be limited to the six pockets illustrated in the drawings. It is necessary that the spacing of the pockets be such so as to provide a complete seal between the filter and the outlet of the housing. Other than this, the number of pockets may vary in accordance with the requirements of the impellor and the specific size of the impellor.

It is to be understood that when the feed mechanism is being utilized in conjunction with a relatively closed container, such as a truck or a railway car, the vacuum drawn above the feed mechanism will be dissipated in the material above the feed mechanism and this vacuum will not be drawn in the container.

Although only two preferred embodiments of the invention have been specifically illustrated and described herein, it is to be understood that other modifications may be made in the feed mechanism without departing from the spirit and scope of the invention, as defined by the appended claims.

I claim:

1. A feed mechanism for pulverulent material having gas entrapped therein, comprising a housing having radially disposed inlet and outlet, an impeller mounted for rotation within said housing, said impeller having a plurality of radiating vanes defining successive pockets movable past said inlet and outlet, the extremities of each of said vanes being adapted to engage the inner wall surface of said housing as said impeller is rotated, suction means including filters associated with said pockets for drawing gas from the pulverulent material in each pocket when a pocket is in communication with said inlet while restraining escape of pulverulent material contained in such pocket thereby to compact the pulverulent material in such pocket, and discharge means when a pocket is in communication with said outlet to provide flow of gas under pressure to facilitate discharge of compacted material from such pocket into said outlet.

2. The feed mechanism of claim 1 wherein said discharge means includes a pressurized fluid duct coupled to said housing at said outlet for fluidizing and conveying pulverulent material delivered to said outlet by said impellor, and said housing being provided with a vent remote from said means for venting empty pockets passing from said outlet to said inlet.

3. The feed mechanism of claim 1 wherein said housing has a base means for sealing engagement with a container and said feed mechanism is a filler.

4. The feed mechanism of claim 1 wherein said filter forms the bottom of each impellor pocket, and control means for automatically controlling the flow of fluid through said filters as said impellor rotates.

5. The feed mechanism of claim 1 wherein said filter forms the bottom of each impellor pocket, and control means for automatically controlling the flow of fluid through said filters as said impellor rotates, said control means including said impellor being hollow, passages opening from said pockets into the interior of said impellor, and a valve member in the form of a coaxially aligned stator in said impellor defining fluid ports for selective communication with said passages.

6. The feed mechanism of claim 1 wherein said discharge means includes a pressurized fluid duct coupled to said housing at said outlet for fluidizing and conveying pulverulent material delivered to said outlet by said impellor.

7. The feed mechanism of claim 1 wherein said discharge means includes a pressurized fluid duct coupled to said housing at said outlet for fluidizing and conveying pulverulent material delivered to said outlet by said impellor, said impellor projecting into said duct through said outlet with said pockets opening radially and axially into said duct for scavenging by fluid passing therethrough.

8. A feed mechanism for pulverulent material having gas entrapped therein comprising a housing having an inlet and an outlet, an impellor mounted within said housing for rotation, said impellor having a plurality of radiating vanes defining pockets, and means for drawing gases from pulverulent material in said pockets as the pulverulent material is moved by said impellor from said inlet toward said outlet whereby pulverulent material discharged from said housing is compacted and of lower gas content as compared to the same pulverulent material entering said housing, said means including a filter forming the bottom of each impellor pocket, and control means for automatically controlling the flow of fluid through said filters as said impellor rotates, said control means including said impellor being hollow, passages opening from said pockets into the interior of said impellor, and a valve member in the form of a coaxially aligned stator in said impellor defining and sealing two ports forming two differential fluid pressure zones for selective communication with said passages, said stator being dumbbell shape in transverse section and in combination with said impellor forming said ports.

9. The feed mechanism of claim 8 together with a central vent port in said valve member, and diametrically opposite passages extending from said central vent port to simultaneously vent two diametrically opposite pockets.

10. A feed mechanism for pulverulent material having gas entrapped therein comprising a housing having an inlet and an outlet, an impellor mounted within said housing for rotation, said impellor having a plurality of radiating vanes defining pockets, and means for drawing gases from pulverulent material in said pockets as the pulverulent material is moved by said impellor from said inlet toward said outlet whereby pulverulent material discharged from said housing is compacted and of lower gas content as compared to the same pulverulent material entering said housing, said means including a gas discharge passage through a wall of said housing, and a filter in said passage and forming a portion of the internal surface of said housing for restricting flow through said passage to removed gases, said impellor vanes having scrapers facing in the direction of rotation of said rotor and being cooperative with said filter for repeatedly cleaning said filter.

11. A feed mechanism for pulverulent material having gas entrapped therein, comprising a housing having radially disposed inlet and outlet, an impeller mounted for rotation within said housing, said impeller having a plurality of radiating vanes defining successive pockets movable past said inlet and outlet, the extremities of each of said vanes being adapted to engage the inner wall surface of said housing as said impeller is rotated, suction means including a filter associated with said vanes for drawing gas from the pulverulent material in such pocket when a pocket is in communication with said inlet, while restraining escape of pulverulent material contained in such pocket, thereby to compact the pulverulent material in such pocket, and means when a pocket is in communication with said outlet to provide flow of gas under pressure in reverse direction through said filter into such pocket to effect discharge of compacted material therein through said outlet and to clear the inner surface of said filter.

12. The combination set forth in claim 11 in which means are provided when one of such pockets has the ends of both of its associated vanes against the inner surface of said housing to vent the interior of such pocket to atmosphere while isolating said suction means from said pressure means.

References Cited

UNITED STATES PATENTS

| 1,609,401 | 12/1920 | Crites et al. | 302—49 |
| 2,301,350 | 11/1942 | Whitfield | 302—23 |
| 2,921,721 | 1/1960 | Brooks | 302—49 |

FOREIGN PATENTS

| 342,731 | 10/1921 | Germany. |
| 359,110 | 9/1922 | Germany. |
| 660,808 | 6/1938 | Germany. |
| 600,649 | 12/1959 | Italy. |

ANDRES H. NIELSEN, *Primary Examiner.*